(12) United States Patent
Protasiewicz et al.

(10) Patent No.: US 8,449,640 B2
(45) Date of Patent: May 28, 2013

(54) AUXILIARY O-RING GLAND

(75) Inventors: Michael Protasiewicz, Waukesha, WI (US); Jason Scherck, Madison, WI (US); Kelly A. Detra, Brooklyn, WI (US); Stephen L. Fallon, Oregon, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 322 days.

(21) Appl. No.: 12/895,076

(22) Filed: Sep. 30, 2010

(65) Prior Publication Data

US 2011/0232245 A1 Sep. 29, 2011

Related U.S. Application Data

(60) Provisional application No. 61/247,184, filed on Sep. 30, 2009.

(51) Int. Cl.
*B01D 46/00* (2006.01)
*F16J 15/02* (2006.01)

(52) U.S. Cl.
USPC ............. 55/502; 277/637; 277/639; 277/641; 277/642

(58) Field of Classification Search
CPC ...... F16J 15/061; F16J 15/062; B01D 2271/02
USPC ................ 55/502; 277/616, 637, 639, 641; 277/642
See application file for complete search history.

(56) References Cited

U.S. PATENT DOCUMENTS

| 4,176,641 | A | 12/1979 | Perr |
|---|---|---|---|
| 4,249,499 | A | 2/1981 | Perr |
| 4,325,219 | A | 4/1982 | Stang et al. |
| 4,440,193 | A | 4/1984 | Matheson |
| 4,488,889 | A | 12/1984 | McCarroll |
| 4,732,550 | A | 3/1988 | Suzuki et al. |
| 4,753,266 | A | 6/1988 | Matheson et al. |
| 4,842,287 | A | 6/1989 | Weeks |
| 4,865,136 | A | 9/1989 | White |
| 4,934,742 | A | 6/1990 | Williamson |
| 5,009,435 | A | 4/1991 | Villanyi et al. |
| 5,080,787 | A | 1/1992 | Brown et al. |
| 5,171,430 | A | 12/1992 | Beach et al. |
| 5,362,390 | A | 11/1994 | Widenhoefer et al. |
| 5,450,835 | A | 9/1995 | Wagner |
| 5,462,679 | A | 10/1995 | Verdegan et al. |
| 5,549,821 | A | 8/1996 | Bounnakhom et al. |
| 5,556,440 | A | 9/1996 | Mullins et al. |
| 5,556,542 | A | 9/1996 | Berman et al. |
| 5,575,912 | A | 11/1996 | Herman et al. |

(Continued)

FOREIGN PATENT DOCUMENTS

JP 5868550 4/1983

OTHER PUBLICATIONS

International Search Report for PCT/US2010/050900 dated Nov. 15, 2010.
Written Opinion for PCT/US2010/050900 dated Nov. 15, 2010.

(Continued)

*Primary Examiner* — Robert Clemente
(74) *Attorney, Agent, or Firm* — Andrus, Sceales, Starke & Sawall, LLP

(57) ABSTRACT

Disclosed are sealing apparatuses having a sealing gland for an O-ring, the sealing gland comprising a primary gland and an auxiliary gland located below the primary gland. The apparatuses may be utilized for filter cartridges in filter systems.

17 Claims, 13 Drawing Sheets

U.S. PATENT DOCUMENTS

| | | | |
|---|---|---|---|
| 5,637,217 | A | 6/1997 | Herman et al. |
| 5,647,712 | A | 7/1997 | Demirdogen et al. |
| 5,656,166 | A | 8/1997 | Linnersten et al. |
| 5,753,117 | A | 5/1998 | Jiang |
| 5,775,303 | A | 7/1998 | Sweetland et al. |
| 5,779,900 | A | 7/1998 | Holm et al. |
| 5,795,477 | A | 8/1998 | Herman et al. |
| 5,846,417 | A | 12/1998 | Jiang et al. |
| 5,855,772 | A | 1/1999 | Miller et al. |
| 5,868,932 | A | 2/1999 | Guichaoua et al. |
| 5,894,991 | A | 4/1999 | Edwards et al. |
| 5,958,237 | A | 9/1999 | Cort et al. |
| 5,983,863 | A | 11/1999 | Cavanagh et al. |
| 5,988,265 | A | 11/1999 | Marthaler |
| 6,017,300 | A | 1/2000 | Herman |
| 6,019,717 | A | 2/2000 | Herman |
| 6,085,915 | A | 7/2000 | Schwandt et al. |
| 6,237,628 | B1 | 5/2001 | Miller et al. |
| 6,273,031 | B1 | 8/2001 | Verdegan et al. |
| 6,290,208 | B1 | 9/2001 | Arnett |
| 6,354,283 | B1 | 3/2002 | Hawkins et al. |
| 6,358,416 | B1 | 3/2002 | Miller et al. |
| 6,364,822 | B1 | 4/2002 | Herman et al. |
| 6,375,700 | B1 | 4/2002 | Jaroszczyk et al. |
| 6,387,144 | B1 | 5/2002 | Jaroszczyk et al. |
| 6,391,076 | B1 | 5/2002 | Jaroszczyk et al. |
| 6,416,561 | B1 | 7/2002 | Kallsen et al. |
| 6,482,247 | B2 | 11/2002 | Jaroszczyk et al. |
| 6,511,599 | B2 | 1/2003 | Jaroszczyk et al. |
| 6,554,140 | B2 | 4/2003 | Steger et al. |
| 6,571,961 | B2 | 6/2003 | Demirdogen |
| 6,571,962 | B2 | 6/2003 | Thomas |
| 6,599,229 | B1 | 7/2003 | South et al. |
| 6,615,989 | B2 | 9/2003 | Brown et al. |
| 6,641,637 | B2 | 11/2003 | Kallsen et al. |
| 6,795,646 | B1 | 9/2004 | Wieczorek et al. |
| 6,814,772 | B1 | 11/2004 | Wake et al. |
| 6,827,750 | B2 | 12/2004 | Drozd et al. |
| 6,902,669 | B2 | 6/2005 | Jiang |
| 6,988,625 | B2 | 1/2006 | Thomas et al. |
| 7,020,389 | B2 | 3/2006 | Wieczorek |
| 7,097,694 | B1 | 8/2006 | Jaroszczyk et al. |
| 7,153,422 | B2 | 12/2006 | Herman et al. |
| 7,217,361 | B2 | 5/2007 | Connor et al. |
| 7,413,588 | B2 | 8/2008 | Holzmann et al. |
| 7,434,697 | B2 | 10/2008 | Bagci et al. |
| 7,493,881 | B2 | 2/2009 | Smith et al. |
| 7,572,306 | B2 | 8/2009 | Hawkins et al. |
| 7,581,558 | B2 | 9/2009 | Martin et al. |
| 7,591,279 | B2 | 9/2009 | Martin et al. |
| 7,614,504 | B2 | 11/2009 | South et al. |
| 7,648,543 | B2 | 1/2010 | Faber et al. |
| 7,655,140 | B2 | 2/2010 | Wieczorek et al. |
| 7,717,092 | B2 | 5/2010 | Wieczorek |
| 7,754,123 | B2 | 7/2010 | Verdegan et al. |
| 2002/0036163 | A1 | 3/2002 | Miller et al. |
| 2002/0100263 | A1 | 8/2002 | Jaroszczyk et al. |
| 2002/0152732 | A1 | 10/2002 | Kallsen et al. |
| 2002/0170856 | A1 | 11/2002 | Jaroszczyk et al. |
| 2004/0091654 | A1 | 5/2004 | Kelly et al. |
| 2005/0026526 | A1 | 2/2005 | Verdegan et al. |
| 2006/0053756 | A1 | 3/2006 | Hawkins et al. |
| 2007/0000831 | A1 | 1/2007 | Kelly et al. |
| 2007/0021021 | A1 | 1/2007 | Verdegan et al. |
| 2007/0241042 | A1 | 10/2007 | Martin et al. |
| 2008/0011672 | A1 | 1/2008 | Schwartz et al. |
| 2008/0035121 | A1 | 2/2008 | Wieczorek |
| 2008/0203614 | A1 | 8/2008 | Holzmann et al. |
| 2008/0283463 | A1 | 11/2008 | Hawkins et al. |
| 2008/0283464 | A1 | 11/2008 | Hawkins et al. |
| 2008/0308481 | A1 | 12/2008 | Wieczorek et al. |
| 2009/0014381 | A1 | 1/2009 | South et al. |
| 2009/0050554 | A1 | 2/2009 | Shaam |
| 2009/0065447 | A1 | 3/2009 | Forrest et al. |
| 2009/0071892 | A1 | 3/2009 | Malgorn |
| 2009/0120854 | A1 | 5/2009 | Parikh et al. |
| 2009/0152189 | A1 | 6/2009 | Beaulieu |
| 2009/0193770 | A1 | 8/2009 | Holzmann et al. |
| 2009/0241315 | A1 | 10/2009 | Menez et al. |
| 2009/0242475 | A2 | 10/2009 | Menez et al. |
| 2009/0266346 | A1 | 10/2009 | Wagner et al. |
| 2009/0283466 | A1 | 11/2009 | Martin et al. |
| 2010/0050871 | A1 | 3/2010 | Moy et al. |
| 2010/0089805 | A1 | 4/2010 | South et al. |
| 2010/0101425 | A1 | 4/2010 | Herman et al. |
| 2010/0101993 | A1 | 4/2010 | Wells et al. |
| 2010/0107883 | A1 | 5/2010 | Faber et al. |
| 2010/0108590 | A1 | 5/2010 | Curt et al. |
| 2010/0126924 | A1 | 5/2010 | Hawkins et al. |
| 2010/0176047 | A1 | 7/2010 | Bagci et al. |
| 2010/0200490 | A1 | 8/2010 | Martin et al. |

OTHER PUBLICATIONS

International Preliminary Report on Patentability for PCT/US2010/050900 dated Apr. 3, 2012.

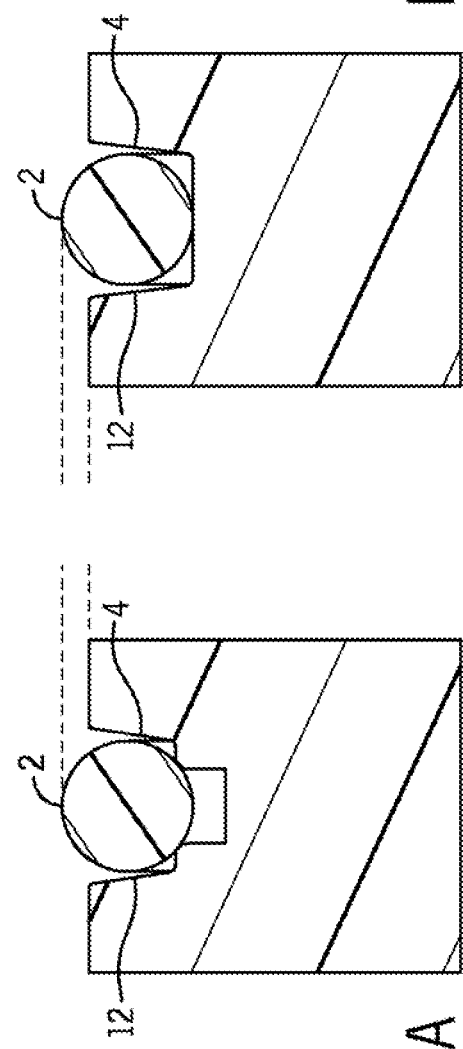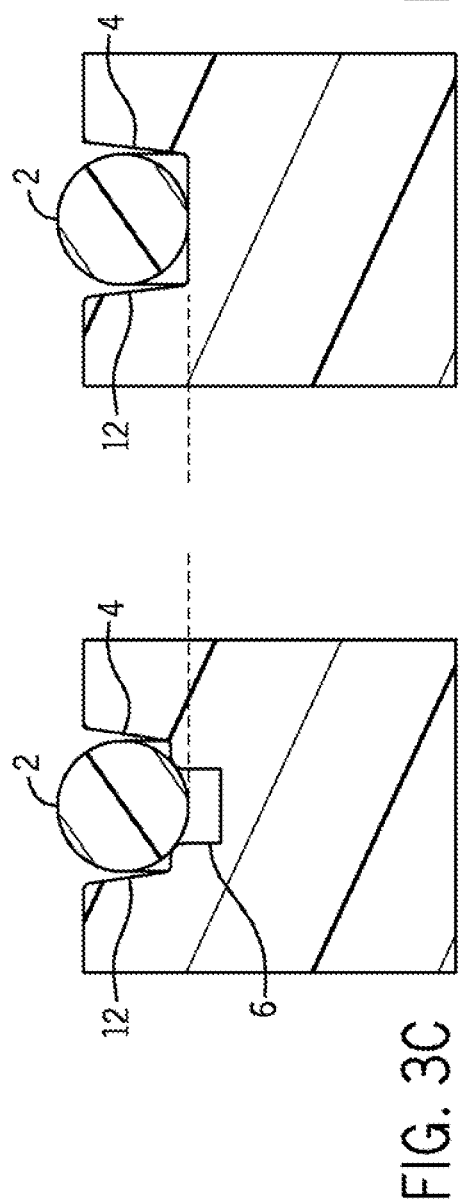

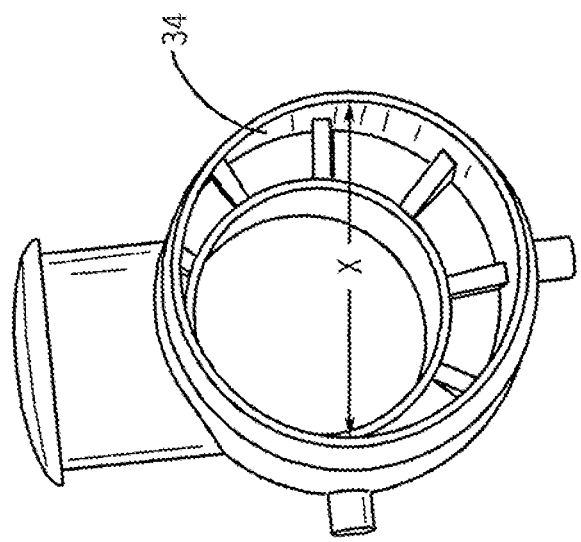
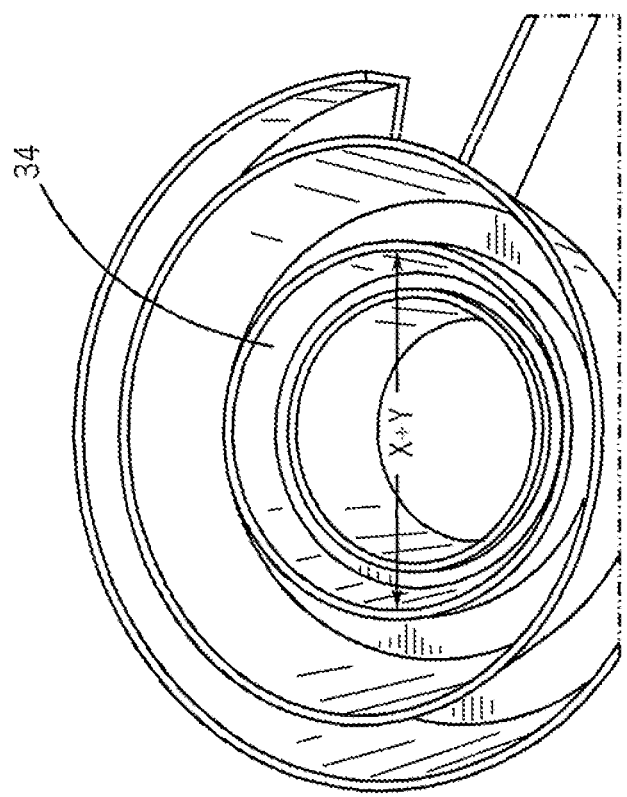
FIG. 13B
FIG. 13A

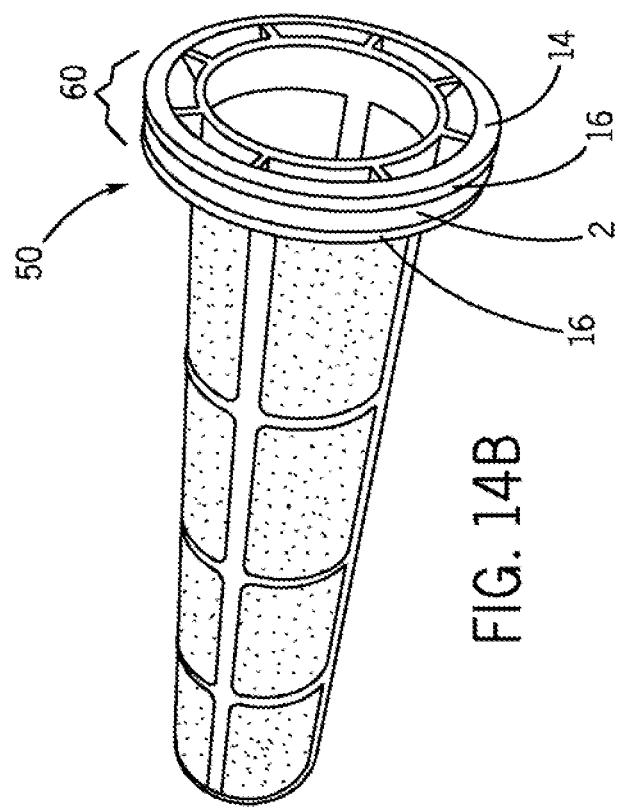
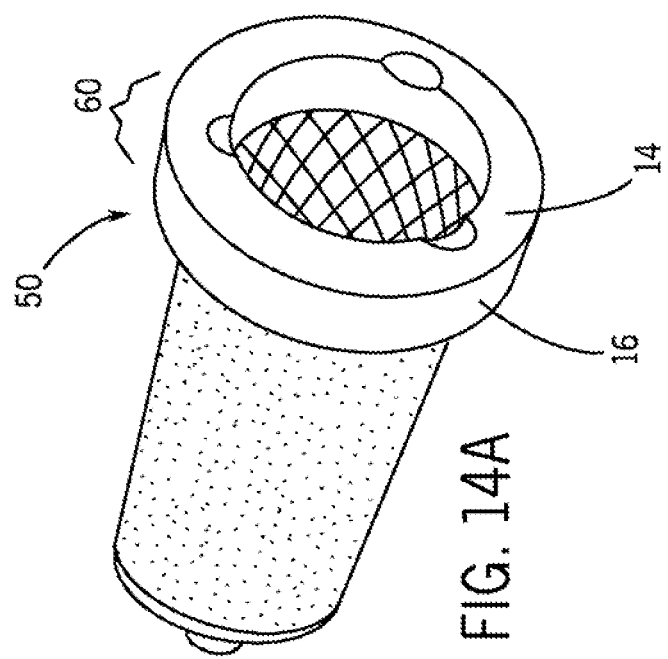
FIG. 14B
FIG. 14A

AUXILIARY O-RING GLAND

CROSS-REFERENCE TO RELATED APPLICATIONS

The present application claims the benefit of priority under 35 U.S.C. §119(e) to U.S. Provisional Patent Application No. 61/247,184, filed on Sep. 30, 2010, the content of which is incorporated herein by reference in its entirety.

BACKGROUND

The field of the invention relates to sealing apparatuses and systems. In particular, the field of the invention relates to sealing apparatuses and systems having auxiliary glands for O-rings. The sealing apparatuses and systems may be utilized in filter applications.

Sealing apparatuses and systems are utilized in the art in order to removably connect and seal multiple components. O-rings may be utilized in such apparatuses and systems. Typically, an O-ring is disposed in a sealing gland on an outside surface or periphery of a first component, which typically is substantially cylindrical in shape. The first component is inserted into a second component where the second component comprises a sealing surface for receiving the first component such as a sealing ring. As such, the first component may be termed an "insertion component" and the second component may be termed a "receiving component." When the insertion component is installed in the receiving component, the sealing surface of the receiving component (e.g., a sealing ring) contacts the O-ring of the insertion component and compresses the O-ring into the sealing gland of the insertion component to create a seal between the insertion component and the receiving component.

Sealing apparatuses and systems may have to accommodate receiving components (e.g., housings) that have sealing rings that vary in dimension or in composition. For example, sealing rings may vary in size by as much as 0.5%, 1%, 2%, 3%, 4%, 5%, or more, and it is preferable that sealing be maximized for multiple housings despite this variability in dimension. The composition of the insertion component and the receiving component also may affect their hardness or compressibility for purposes of sealing and installing the insertion component in the receiving component. It is desirable that sealing be maximized and that the installation force be minimized in these sealing apparatuses and systems in order to avoid damage to components during installation, despite variability in dimension and composition of the sealing components. In order to address these issues, sealing apparatuses in the prior art have utilized an O-ring that is irregularly-shaped in cross-section rather than being substantially circular in cross-section. However, it is desirable to devise a sealing apparatus or system: (1) that utilizes an O-ring that is substantially circular in cross-section; (2) that is adaptable to sealing components that differ in size or composition (e.g., that is adaptable to sealing rings that differ in diameter by 0.5%, 1%, 2%, 3%, 4%, 5%, or more); and (3) that minimizes installation force.

SUMMARY

Disclosed are sealing apparatuses and systems comprising an auxiliary gland for an O-ring. In some embodiments, the apparatuses and systems comprise: (a) a substantially cylindrical base; (b) an O-ring; and (c) a sealing gland for the O-ring on a periphery of the base, the sealing gland comprising a primary gland and an auxiliary gland located below the primary gland, where the O-ring sits in the sealing gland and the O-ring contacts a sealing surface that compresses the O-ring into the sealing gland to create a seal. Typically the O-ring sits in the sealing gland and is in contact with the primary gland while protruding into the auxiliary gland.

The base of the sealing apparatuses and systems may have a suitable hardness. In some embodiments, the base has a hardness of at least about 60 Durometer A (or of at least about 70, 80, 90 Durometer A, or of at least about 40, 55, or 65 Durometer D).

Sealing surfaces for the O-ring may include, but are not limited to a sealing ring, a housing ring, or a sealing plate (which may be conical-drafted, cylindrical, oval, or race track shaped). The sealing surface of the sealing apparatuses and systems also may have a suitable hardness. In some embodiments, the sealing surface has a hardness of at least about of at least about 60 Durometer A (or of at least about 70, 80, 90 Durometer A, or at least about 40, 55, or 65 Durometer D).

In the apparatuses and systems, the O-ring typically is substantially circular in cross-section and typically is not irregularly shaped in cross-section. For example, an O-ring that is substantially circular in cross-section typically has a maximum cross-sectional diameter ($CS_{Max}$) and a minimum cross-sectional diameter ($CS_{Min}$) that do not differ in size by more than 10% (preferably that do not differ in size by more than 5%, 3%, or 1%) (i.e., $(CS_{Max}-CS_{Min})/CS_{Min} \leq 10\%$, 5%, 3%, or 1%). In some embodiments, the O-ring has a hardness of at least about 30, 40, 50, 60, 70, or 80 Durometer A).

In the apparatuses and systems, the width (w) and the depth (d) of the auxiliary gland may be modified to control installation force. For example, the width and depth of the auxiliary gland may be selected to minimize installation force. In some embodiments, the auxiliary gland has a width (w), the O-ring has a cross-sectional diameter (O), and $0.3 < w/O < 0.8$. In further embodiments, the auxiliary gland has a depth (d), the O-ring has a cross-sectional diameter (O), and $0.2 < w/O < 0.4$. In even further embodiments, the auxiliary gland has a width (w), the O-ring has a cross-sectional diameter (O), and $0.3 < w/O < 0.8$; and the auxiliary gland has a depth (d), and $0.2 < w/O < 0.4$.

The apparatuses and systems having an auxiliary gland are configured to reduce installation force in comparison to apparatuses and systems not having an auxiliary gland. In some embodiments, the apparatuses and systems having an auxiliary gland exhibit at least about a 10% reduction in installation force in comparison to apparatuses and systems not having an auxiliary gland over a range of percent compression of the O-ring from about 12% to about 22%. In further embodiments, the apparatuses and systems having an auxiliary gland exhibit at least about a 22% reduction in installation force in comparison to apparatuses and systems not having an auxiliary gland over a range of percent compression of the O-ring from about 12% to about 22%.

The apparatuses and systems may be configured to seal against various gases or fluids. In some embodiments, the apparatuses and systems are configured for sealing against air. In other embodiments, the apparatuses and systems are configured for sealing against hydrocarbon liquid (e.g., natural or synthetic hydrocarbon liquids), water, or a mixture thereof.

The sealing apparatuses and systems disclosed herein may be utilized in filtering systems. Contemplated herein are filter cartridges for filtering systems, the cartridge comprising a sealing apparatus, the sealing apparatus comprising: (a) a substantially cylindrical base provided by a sealing cap at an end of the filter cartridge; (b) an O-ring; and (c) a sealing gland for the O-ring on a periphery of the base, the sealing gland comprising a primary gland and an auxiliary gland located below the primary gland; wherein the O-ring sits in the sealing gland and the O-ring contacts a sealing surface in the filter system that compresses the O-ring into the sealing gland to create a seal. In some embodiments of the contemplated filter cartridges, the O-ring contacts the sealing surface of a housing for a filter system (e.g., a sealing ring on the housing) that compresses the O-ring into the sealing gland to create a seal when the cartridge is inserted in the housing. Contemplated cartridges include air filter cartridges, and contemplated filter systems include air filter systems.

Also contemplated herein are replaceable filter cartridges for a filter system, the cartridges comprising: (a) substantially cylindrical filter media; and (b) at least one sealing cap at an end of the media, the sealing cap comprising a sealing apparatus, the apparatus comprising: (i) a substantially cylindrical base; (ii) an O-ring; and (iii) a sealing gland for the O-ring on a periphery of the base, the sealing gland comprising a primary gland and an auxiliary gland located below the primary gland. When the cartridge is installed in the system, the O-ring sits in the sealing gland and the O-ring contacts a sealing surface of the filter system that compresses the O-ring into the sealing gland to create a seal. The sealing surface of the filter system may present on a housing for the filter system. The housing may comprise a sealing ring providing the sealing surface for the O-ring.

Also contemplated are air filter cartridges for an air filter system, the cartridges comprising: (a) substantially cylindrical filter media; and (b) at least one sealing cap positioned at an end of the media and comprising a sealing apparatus, the apparatus comprising: (i) a substantially cylindrical base; (ii) an O-ring; and (iii) a sealing gland for the O-ring on a periphery of the base, the sealing gland comprising a primary gland and an auxiliary gland located below the primary gland. The air filter cartridge is installed in the air filter system, the O-ring sits in the sealing gland and the O-ring contacts a sealing surface of the filter system (e.g., a sealing ring of a housing for the system) that compresses the O-ring into the sealing gland to create a seal against air in the system.

BRIEF DESCRIPTION OF THE DRAWINGS

FIG. 3 provides a schematic showing similar features in a traditional O-ring sealing gland design and one embodiment of a sealing gland with a primary gland and auxiliary gland as contemplated herein.

FIG. 13 illustrates sealing rings of a housing that differ in size.

FIG. 14 illustrates (A) a filter cartridge of the prior art; and (B) a filter cartridge as contemplated herein.

DETAILED DESCRIPTION

Figure 1:
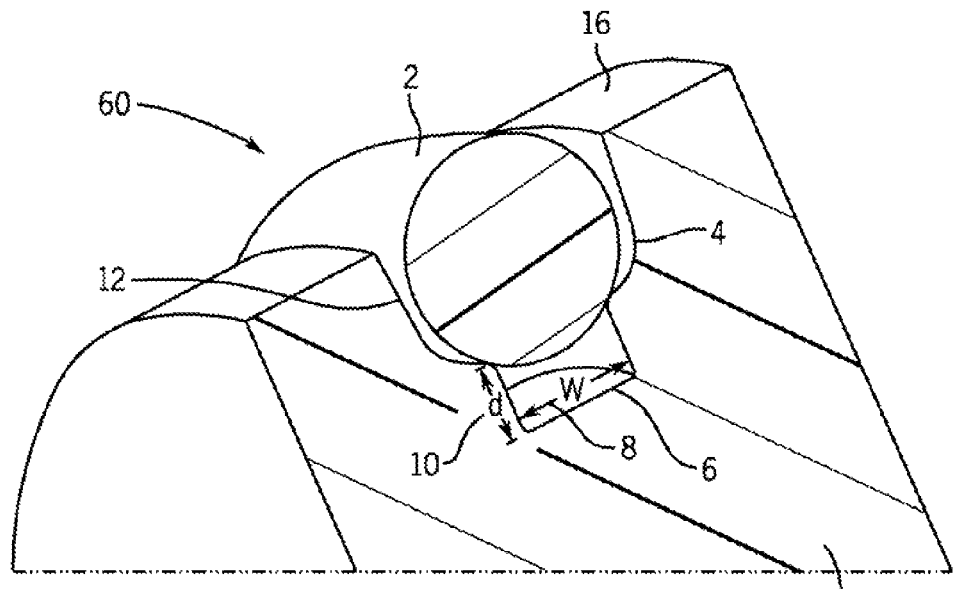
FIG. 1 provides an isometric cross-sectional view of one embodiment of a sealing apparatus as contemplated herein.

The subject matter disclosed herein is described using several definitions, as set forth below and throughout the application.

Unless otherwise specified or indicated by context, the terms "a," "an," and "the," mean "one or more."

As used herein, "about", "approximately" will be understood by persons of ordinary skill in the art and will vary to some extent on the context in which they are used. If there are uses of the term which are not clear to persons of ordinary skill in the art given the context in which it is used, "about" and "approximately" will mean plus or minus ≦10% of the particular term.

As used herein, a component that is "substantially circular" in cross-section such as an O-ring or a component that is "substantially cylindrical," typically has a maximum cross-sectional diameter ($CS_{Max}$) and a minimum cross-sectional diameter ($CS_{Min}$) that do not differ in size by more than 10% (preferably that do not differ in size by more than 5%, 3%, or 1%) (i.e., $(CS_{Max}-CS_{Min})/CS_{Min} \leqq 10\%, 5\%, 3\%,$ or $1\%$).

As used herein, the terms "include" and "including" have the same meaning as the terms "comprise" and "comprising."

Disclosed are sealing apparatuses and systems that utilize an auxiliary gland for an O-ring. The disclosed sealing apparatus and systems are versatile and utilize various sealing surfaces, for example, sealing surfaces provided by sealing rings having varying dimensions and utilizing various installation force. When the sealing apparatuses and systems utilize a relatively large diameter sealing ring, the O-ring is compressed and seals against the rounded corners at the entry to the auxiliary gland. When the sealing apparatuses and systems utilize a relatively small diameter sealing ring, the O-ring requires more compression for sealing and displaces into the auxiliary section of the gland. The auxiliary gland allows displacement of the O-ring which reduces O-ring compression, thus reducing installation force. Under no compression or minimal compression, the majority of the O-ring rests in the primary gland. However, during increased compression, the O-ring will displace into the auxiliary gland.

Typically, O-Rings are torus-shaped objects made from elastomeric compounds such as natural or synthetic rubber, and are used to seal mechanical parts against fluid movement (air or liquid). O-Rings perform their sealing action by deforming to take the shape of their cavity, after being oversized to guarantee a predetermined interference fit. O-Rings are inserted into cavities defined as glands for use in a sealing apparatus or system. An O-Ring is specified by its inner diameter, its cross-section diameter, its material hardness/durometer (typically defined by the Shore A hardness), and its material composition. Parameters used in the discussion of O-Rings may include the following: Inner Diameter (ID)—Diameter of the inside edge of the cross-section; Cross-Section Diameter (CS)—Diameter of a cross-section of the O-ring. Maximum Cross-Section Diameter ($CS_{max}$)—Upper bound on the cross-section diameter for a given set of input requirements; Minimum Cross-Section Diameter ($CS_{min}$)—Lower bound on the cross-section diameter for a given set of input requirements; Cross-Section Tolerance ($CS_{tol}$)—Manufacturing tolerance on the O-Ring cross-section diameter; Maximum Compression ($C_{max}$)—Upper bound for the cross-section compression (in %) when the O-Ring is seated in the gland; used as a design input; and Minimum Compression ($C_{min}$)—Lower bound for the cross-section compression (in %) when the O-Ring is seated in the gland; used as a design input. As utilized herein, the term "effective O-ring diameter" refers to the inside diameter of the O-ring in a non-compressed state (i.e., a resting state) in the sealing gland.

The geometry of the auxiliary gland may be modified in order to minimize compression and installation force. The auxiliary gland width (w) is the width of side to side space available for the O-ring to displace into the auxiliary gland. Installation force and the width of the auxiliary gland are inversely related. If the width is too narrow, the O-ring will have to compress too much to fit into the gland and the advantage of utilizing the auxiliary gland feature will not be optimized. The auxiliary gland depth (d) is the space available in the auxiliary gland for the O-ring to displace into. The auxiliary gland depth and installation force are inversely related because the allowable displacement of the O-ring is modulated by the depth of the gland. If the gland is too shallow, the O-ring will bottom out and the advantage gained by utilizing the auxiliary gland will not be optimized.

There is an upper allowable limit on both the depth and width of the auxiliary gland because if the gland is too large, there is a risk that the O-ring will get caught in the interior gland. This could lead to the apparatus or system not sealing as intended. The auxiliary gland width 'w' and the auxiliary gland depth 'd' vary depending on the cross-sectional diameter of the o-ring 'O'. Consequently, ratios of these two critical features (w/O and d/O) are used to define workable ranges for these features:

$$0.3 < w/O < 0.8$$

$$0.2 < d/O < 0.4$$

These ratios may be chosen based upon trends in test data and consideration to the relationships between installation force and gland geometry listed above. Furthermore, upper limits may be chosen to reduce the risk of an O-ring becoming trapped in the gland.

An additional advantage of the disclosed apparatuses and systems in comparison to traditional O-ring gland design is that the O-ring is centered in the gland by two points of contact instead of merely the tangent contact point at the bottom of the O-ring. This helps to keep the O-ring centered and reduces the likelihood that the O-ring will roll.

The disclosed sealing apparatuses and systems may be incorporated into any device in which sealing is required. In some embodiments, the sealing apparatuses and systems may be incorporated into a filtration product (e.g., an air filtration product). However, the sealing apparatuses and systems also may be incorporated into a devices requiring sealing against liquids such as hydrocarbons, water, or a mixture thereof. The gland geometry and composition of the O-ring may be varied accordingly based on the device into which the sealing apparatuses and systems are incorporated. O-rings of varying durometer may be used to control installation force in the disclosed apparatuses and systems (e.g., O-rings having a durometer of 30, 35, 40, 45, 50, 55, 60, 65, or 70 Shore A). In some embodiments, the disclosed sealing apparatuses and systems utilize an O-ring having a durometer of 40 Shore A.

Referring now to the figures, FIG. 1 provides an isometric cross-sectional view of one embodiment of a sealing apparatus 60 as contemplated herein. Shown is an O-ring 2, placed in a sealing gland 12, which is located on a periphery 16 of a base 14. The sealing gland 12 includes a primary gland 4, and an auxiliary gland 6 located at the bottom of the primary gland 4. The auxiliary gland has a width (w) 8 and a depth (d) 10, as shown.

Figure 2:
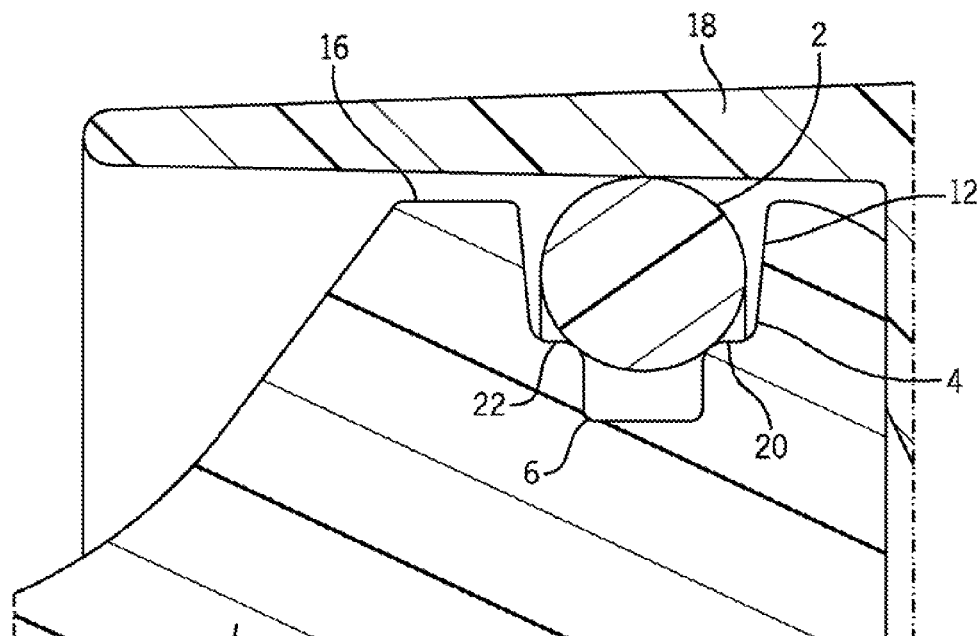
FIG. 2 provides a cross-sectional view of one embodiment of a sealing apparatus as contemplated herein.

FIG. 2 provides a cross-sectional view of one embodiment of a sealing apparatus as contemplated herein. The sealing apparatus includes a base 14 having a sealing gland 12 and O-ring 2 on a periphery 16. The O-ring 2 sits in the sealing gland 12 on the gland steps 20, 22, that define the top of the auxiliary gland 6 and the bottom of the primary gland 4. The O-ring 2 contacts a sealing ring 18 of a housing to form a seal.

FIG. 3 provides a schematic that shows similar features in a traditional O-ring sealing gland design (FIGS. 3B, D) and one embodiment of a sealing gland with a primary gland and auxiliary gland as contemplated herein (FIGS. 3A, C). The width and geometry of the wide walls in the primary gland region are the same as a traditional O-ring sealing gland and adhere to rules for standard O-ring gland design. The offset between the base part and the edge of the O-ring is the same as a traditional O-ring sealing gland and adhere to rules for general O-ring gland design. The effective O-ring diameter is the same regardless of O-ring design. Effective O-ring diameter is an important feature of design because it modulates the amount of interference between the O-ring and the mating part (e.g., a sealing ring).

Figure 4:
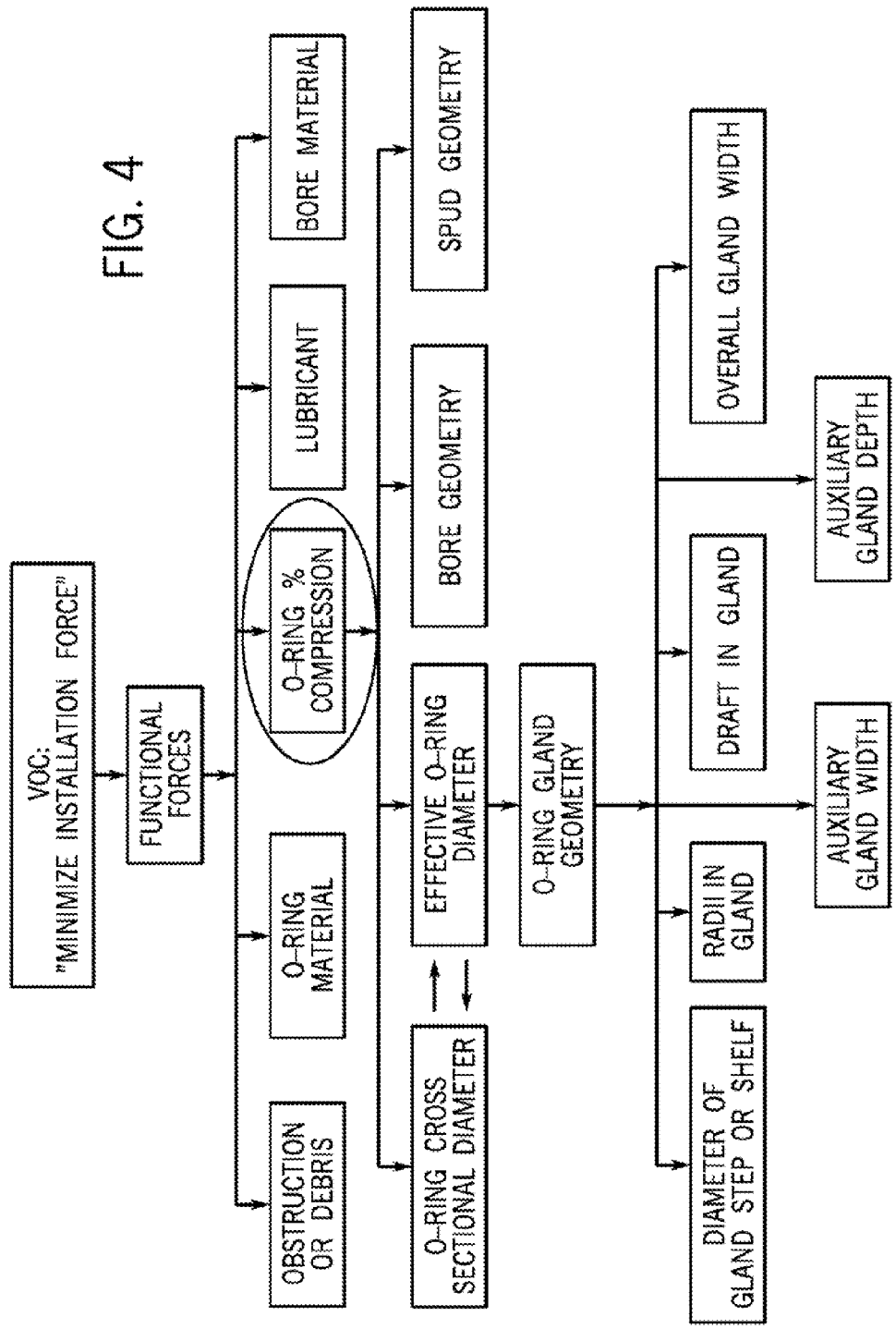
FIG. 4 provides a flow-down chart of parameters that may be modified in order to modulate effective gland diameter.

FIG. 4 provides a flow-down chart of parameters that may be modified in order to modulate effective gland diameter. Effective gland diameter is a factor in installation force. Other factors include width and depth of the auxiliary gland, which may be modulated to reduce the compression of the O-ring, thus reducing installation force.

Figure 5:
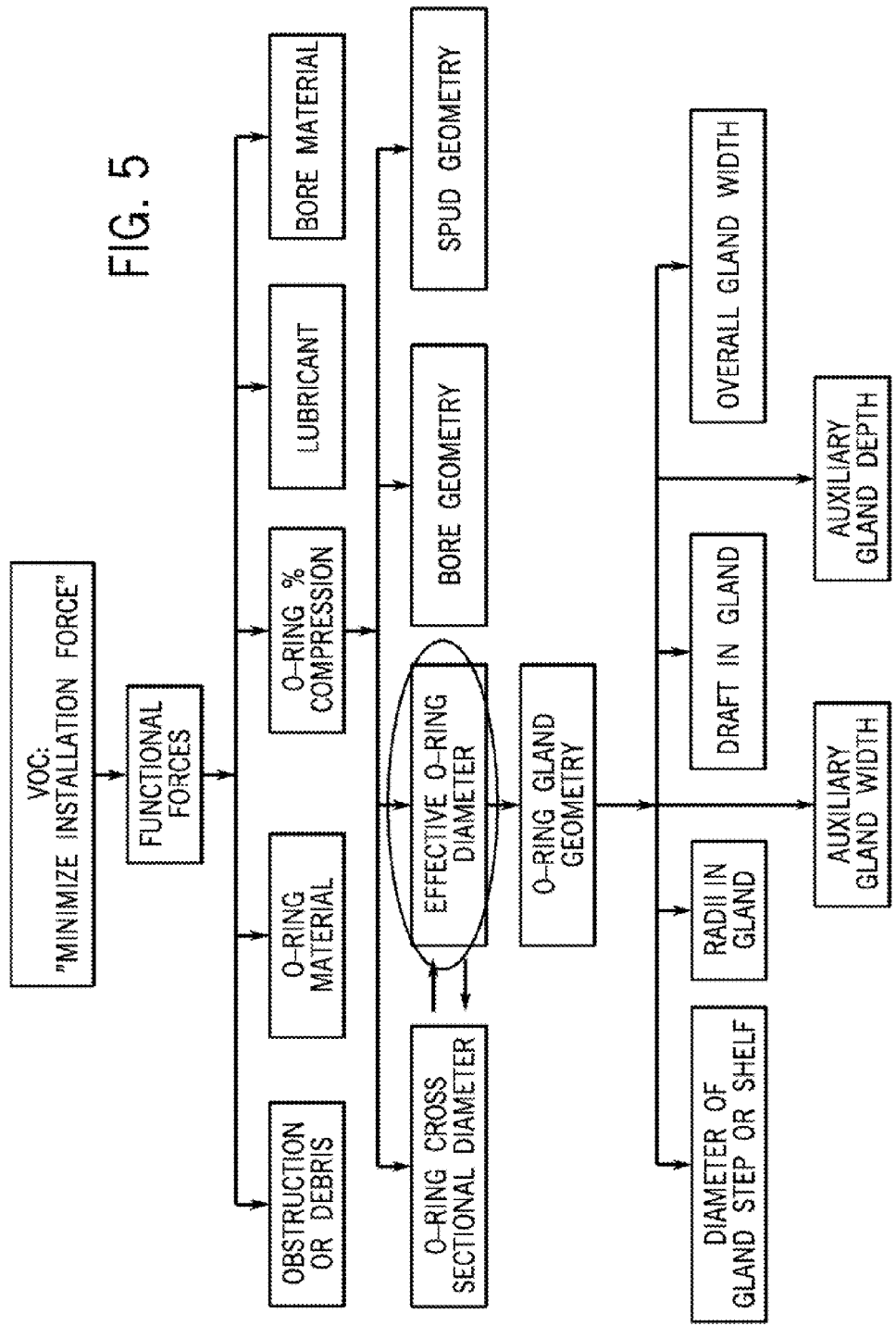
FIG. 5 provides a flow-down chart of parameters that may be modified in order to modulate installation force.

FIG. 5 provides a flow-down chart of parameters that may be modified in order to modulate installation force. These parameters include the effective inside diameter of the O-ring when using an auxiliary gland.

Figure 6:
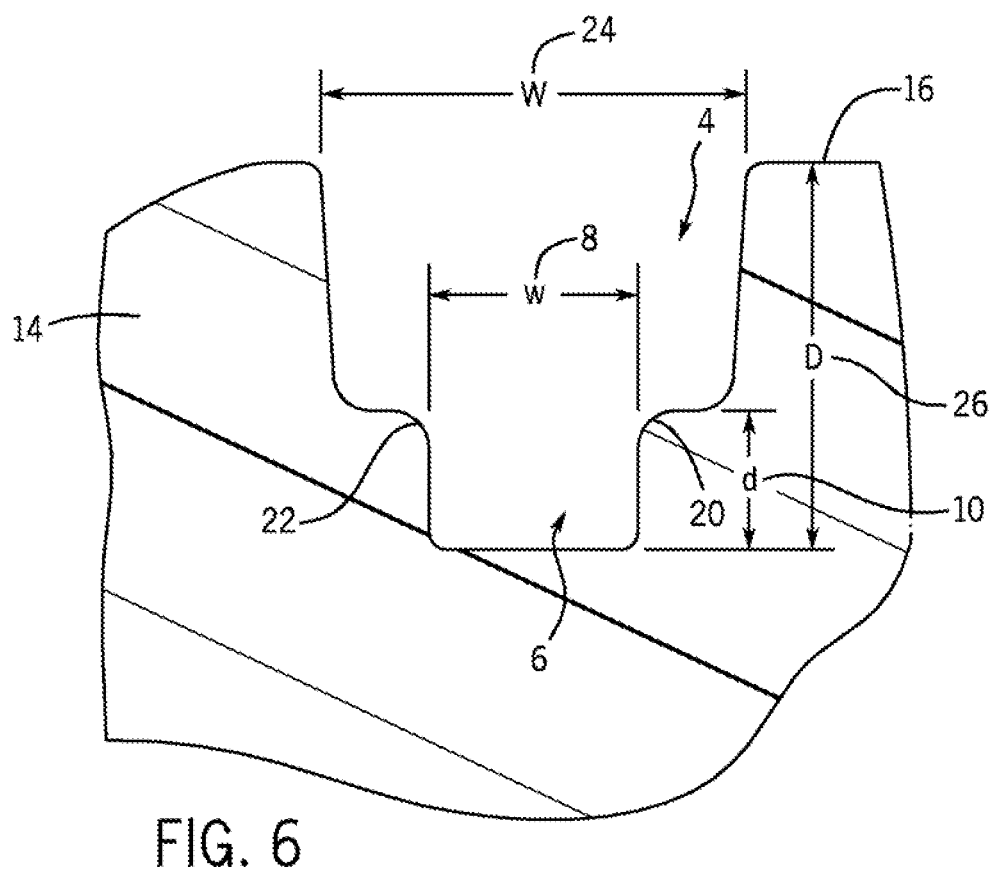
FIG. 6 provides one embodiment of an auxiliary gland as contemplated herein and includes geometrical features of the auxiliary gland that may be modified.

FIG. 6 provides one embodiment of an auxiliary gland as contemplated herein and includes geometrical features of the auxiliary gland that may be modified. The width of the auxiliary gland (w) 8 and depth of the auxiliary gland (d) 10 are shown. Also shown are the width of the primary gland (W) 24 and the depth of the primary gland (D) 26. The gland steps 20, 22 define the top of the auxiliary gland 6 and the bottom of the primary gland 4.

Figure 7:
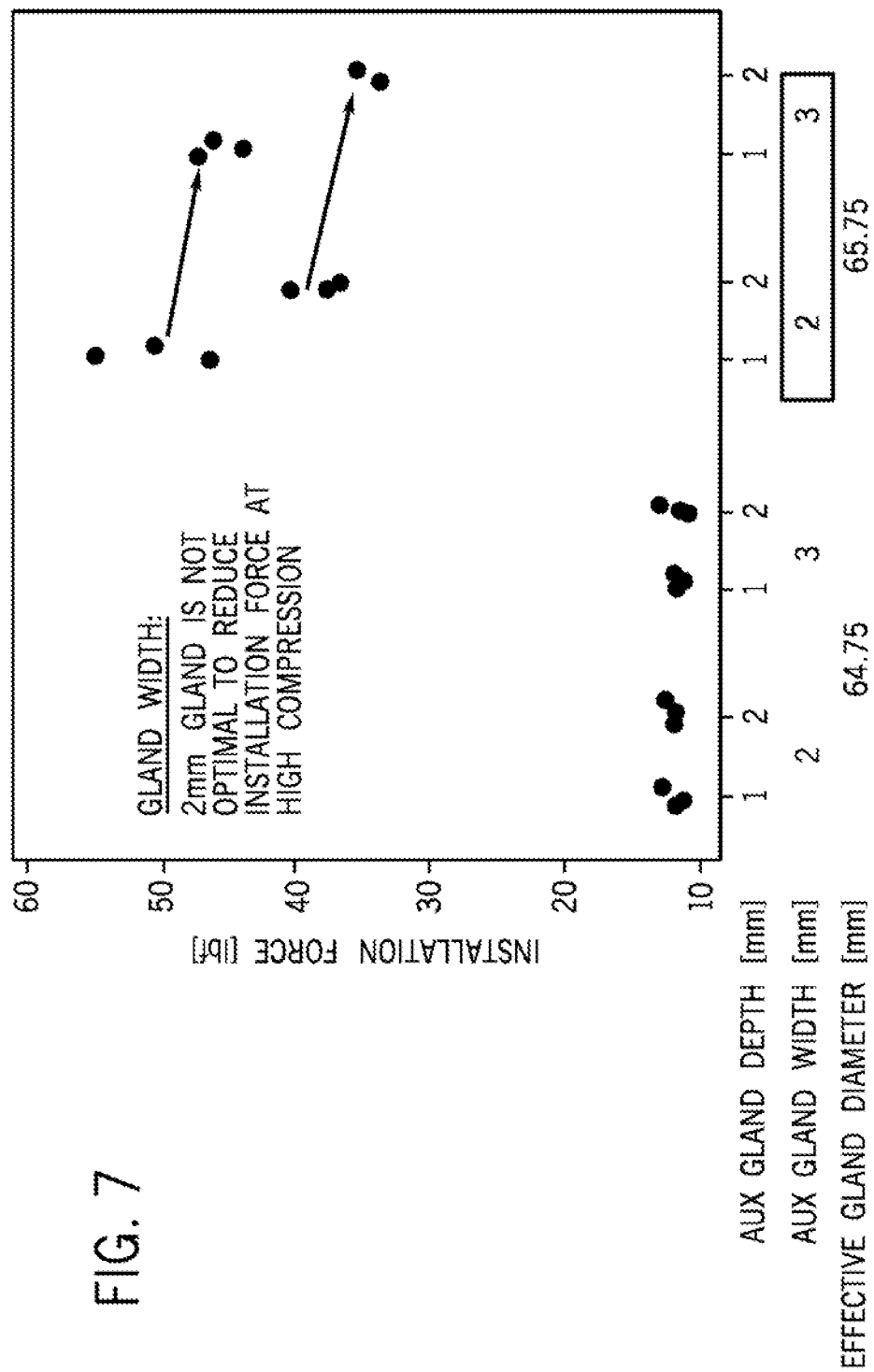
FIG. 7 provides a graph of installation force for different gland designs and illustrates an inverse relationship between gland width and installation force.

FIG. 7 provides a graph of installation force for different gland designs. An inverse relationship between gland width and installation force was observed. An auxiliary gland having a width of 2 mm was not observed to be optimal for reducing installation force.

Figure 8:
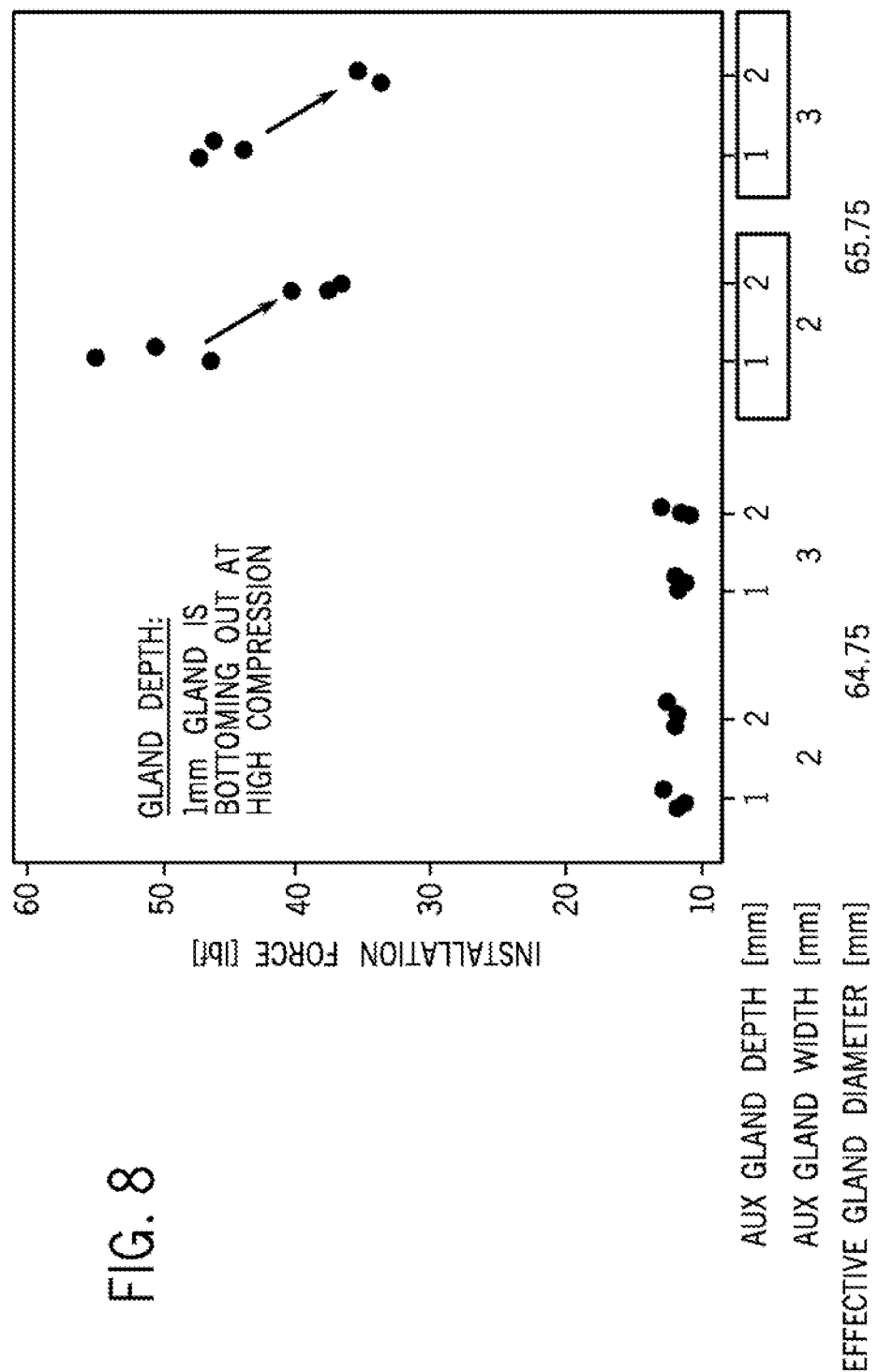
FIG. 8 provides a graph of installation force for different gland designs and illustrates an inverse relationship between gland depth and installation force.

FIG. 8 provides a graph of installation force for different gland designs. An inverse relationship between gland depth and installation force. An auxiliary gland having a depth of 1 mm was observed to result in O-ring bottoming out at high compression and was observed not to be optimal for minimizing installation force.

Figure 9:
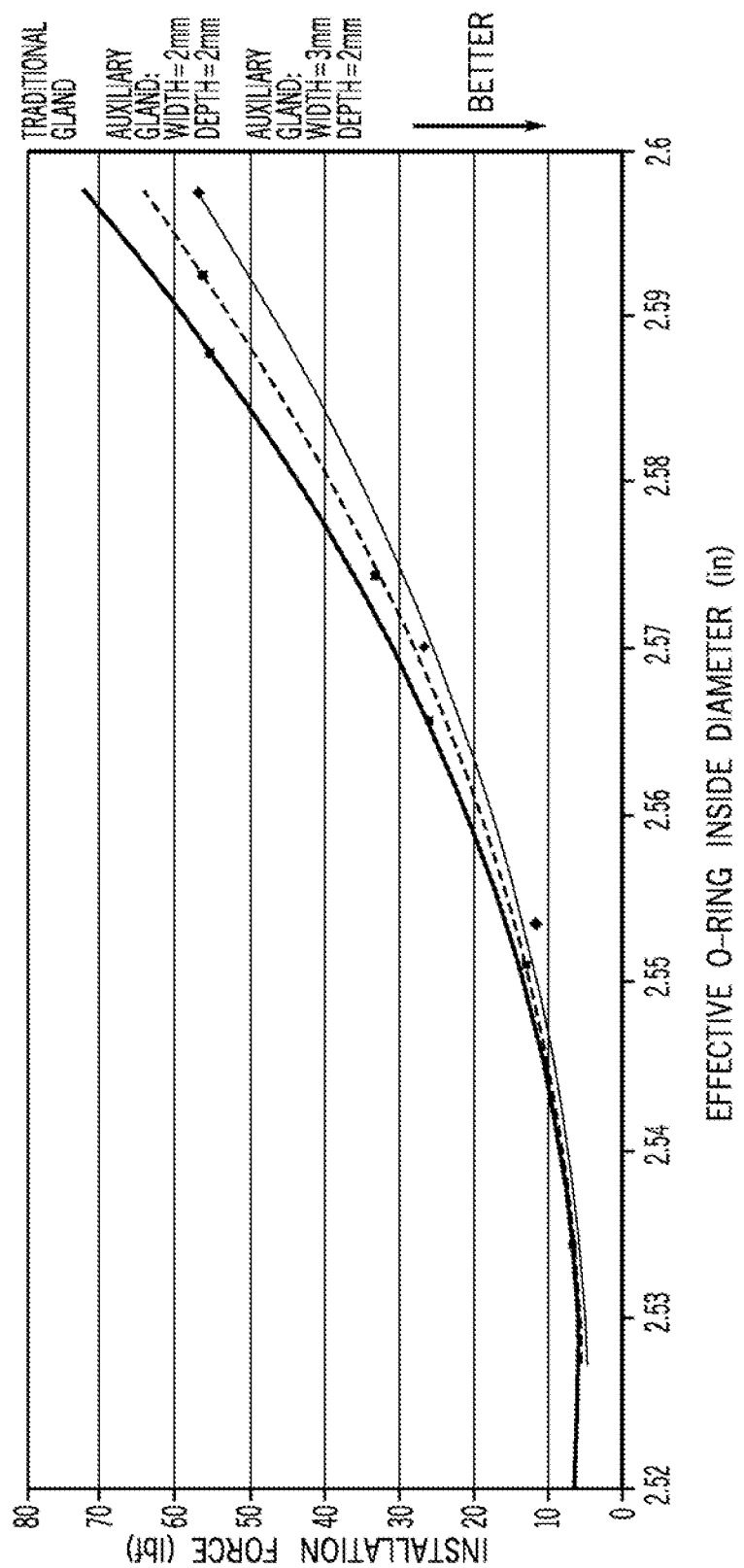
FIG. 9 provides a graph of installation force versus effective O-ring inside diameter.

FIG. 9 provides a graph of installation force versus effective O-ring inside diameter. This graph compares the installation force of three different gland designs with effective O-ring diameter changing. Each data point displayed is the average of six test points (ten points with two highest and two lowest removed). The best fit lines are second degree polynomials. This testing was completed using an O-ring with a durometer of 40 Shore A and no lubrication.

Figure 10:
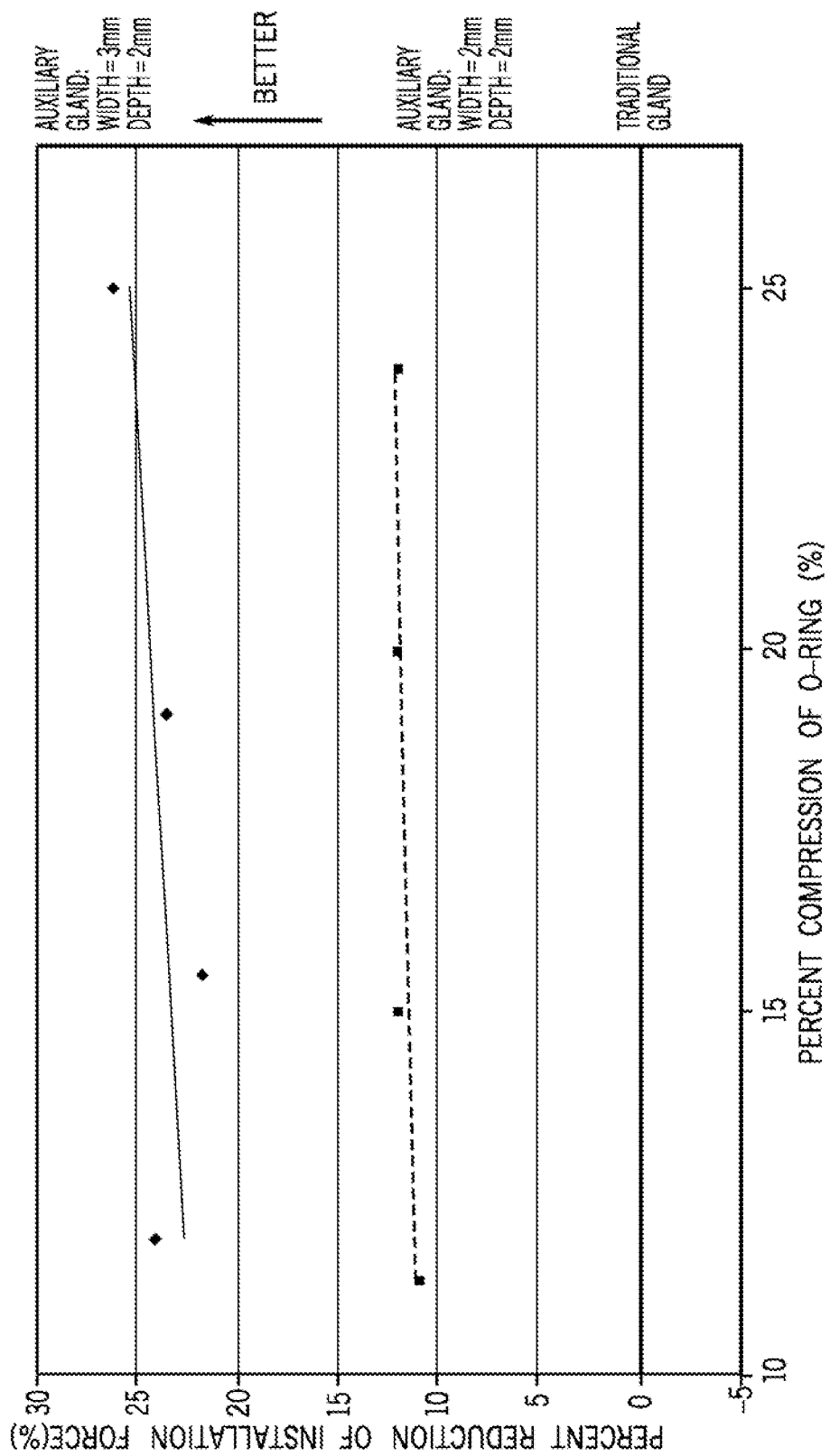
FIG. 10 provides a graph of percent reduction of installation force versus percent compression of O-ring.

FIG. 10 provides a graph of percent reduction of installation force versus percent compression of O-ring. This graph compares the percent reduction of installation force for two gland designs. This graph is derived from the same data used to create FIG. 9. The baseline for percent reduction is a traditional O-ring gland.

Figure 11:
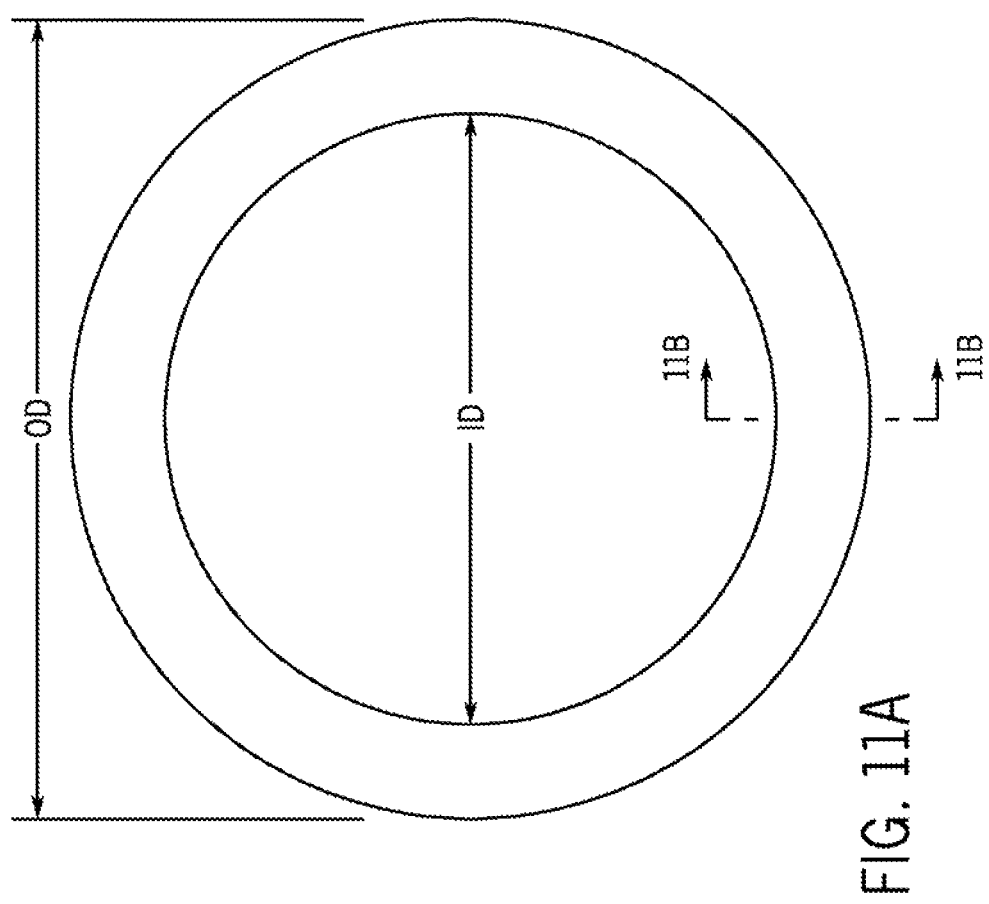
FIG. 11 illustrates an O-ring having an inner diameter (ID), and outer diameter (OD), and a cross-sectional diameter.

FIG. 11 illustrates an O-ring having an inner diameter (ID), and outer diameter (OD), and cross-sectional diameter 40.

Figure 12:
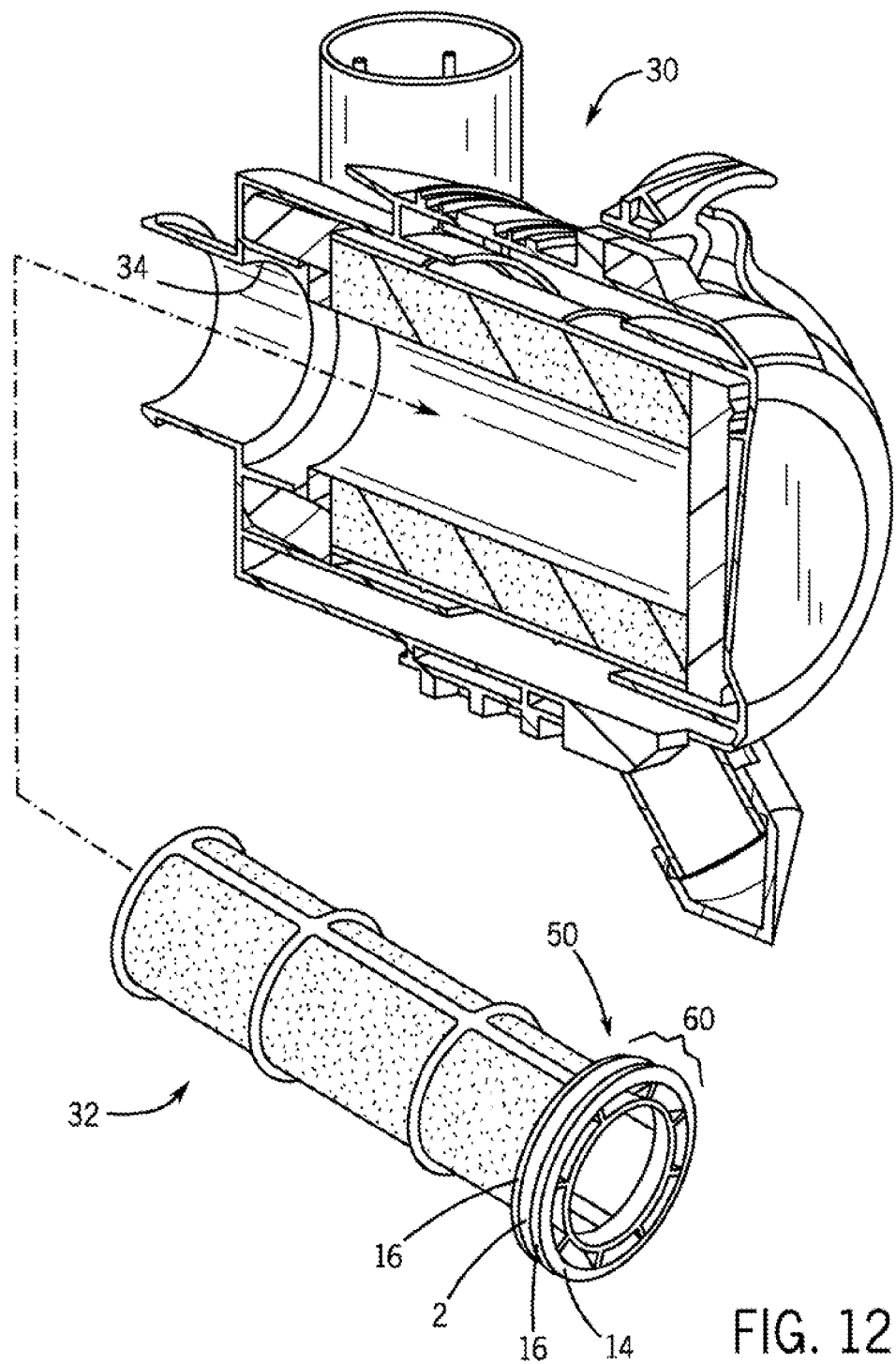
FIG. 12 illustrates one embodiment of the sealing apparatuses and systems as applied herein to a filter system.

FIG. 12 illustrates one embodiment of the sealing apparatuses and systems as disclosed herein. The sealing apparatus 60 is present on an end cap 50 of a filter cartridge 32 for insertion in a sealing ring 34 of a filter housing 30. The end cap 50 comprises a sealing apparatus 60 having an O-ring 2, placed in a sealing gland, which is located on a periphery 16 of a base 14. As shown in FIG. 1, the O-ring 2 is placed in a sealing gland 12, which is located on the periphery 16 of the base 14. The sealing gland 12 includes a primary gland 4, and an auxiliary gland 6 located at the bottom of the primary gland 4 (FIG. 1).

FIG. 13 illustrates one issue addressed by the disclosed sealing apparatuses and systems when applied to filter systems having replaceable cartridges which are inserted into a sealing ring of a housing. FIGS. 13A, B illustrate sealing rings 34 of a housing for a filter system. The inner diameters of the sealing rings vary by a few percent, comparing an inner diameter of sealing ring A ($ID_A$=X+Y) versus an inner diameter of sealing ring B ($ID_B$=X) (i.e., where percentage difference is Y/X and percentage difference may be 0.5%, 1%, 2%, 3%, 4%, 5%, or more). Variability even as low as a one or two millimeters may be intolerable with respect to installing a base of a filter cartridge in the sealing ring such that the cartridge seals properly while installation force is minimized. Bases for filter cartridges formed from certain compositions that are relatively compressible, for example, urethane having a hardness of less than about 65 Durometer A (e.g., some cast urethane materials), can accommodate this variability in dimension of the sealing rings where the base of the filter cartridge may be properly installed and sealed without undue installation force despite the variability in dimension of the sealing ring (see sealing apparatus 60, FIG. 14A). However, bases of filter cartridges formed from compositions that are not as compressible, for example relatively hard compositions having a hardness of greater than about 65 Durometer A (such as polypropylenes, polystyrenes, nylons, or acrylics) may not accommodate this variability in dimension of the sealing rings and may require a sealing apparatus 60 as shown in FIG. 14B. The presently disclosed sealing apparatuses and systems address this variability in sealing ring diameter even where a base of an inserted filter cartridge is formed from a relatively hard composition via use of the auxiliary O-ring gland disclosed herein. It is desirable that a single filter cartridge effectively seal in housings that differ in size (see, e.g., FIGS. 13A, B) and that the cartridge be easy to install (i.e., with minimal installation force). Using a traditional O-ring gland design without an auxiliary gland, there are two options: Option 1, size the base of the filter cartridge for the larger diameter sealing ring (e.g., FIG. 13A). For this option, it would be difficult if not impossible to install the cartridge in the smaller sealing ring (e.g., FIG. 13B). Option 2, size the base of the filter cartridge for the smaller diameter sealing ring (e.g., FIG. 13B). For this option, the filter would not seal properly in the larger sealing ring (e.g., FIG. 13A). The presently disclosed sealing apparatuses and systems therefore may be used to improve modularity of filter cartridges for housings having sealing surfaces that differ in diameter (e.g., by as much as 0.5%, 1%, 2%, 3%, 4%, 5%, or more) even where the filter cartridges comprise end caps made of relatively hard material (e.g., material having a hardness of greater than about 65 Durometer A (such as polypropylenes, polystyrenes, nylons, or acrylics)).

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

What is claimed is:

1. A sealing apparatus comprising:
   (a) a substantially cylindrical base;
   (b) an O-ring; and
   (c) a sealing gland for the O-ring on a periphery of the base, the sealing gland comprising a primary gland and an auxiliary gland located below the primary gland;
   wherein the O-ring sits in the sealing gland and the O-ring contacts a sealing surface that compresses the O-ring into the sealing gland to create a seal; and
   wherein the auxiliary gland has a width (w), the auxiliary gland has a depth (d), the O-ring has a cross-sectional diameter (O), 0.3<w/O<0.8, and 0.2<d/O<0.4.

2. The sealing apparatus of claim 1, wherein the O-ring is substantially circular in cross-section.

3. The sealing apparatus of claim 1, wherein the apparatus is configured for sealing against fluids.

4. The sealing apparatus of claim 1, wherein the apparatus is configured for sealing against air.

5. The sealing apparatus of claim 1, wherein the apparatus exhibits at least about a 10% reduction in installation force in comparison to an apparatus not having an auxiliary gland over a range of percent compression of the O-ring from about 1% to about 25%.

6. The sealing apparatus of claim 1, wherein the apparatus exhibits at least about a 22% reduction in installation force in comparison to an apparatus not having an auxiliary gland over a range of percent compression of the O-ring from about 1% to about 25%.

7. The sealing apparatus of claim 1, wherein the apparatus exhibits at least about a 10% reduction in installation force in comparison to an apparatus not having an auxiliary gland over a range of percent compression of the O-ring from about 12% to about 22%.

8. The sealing apparatus of claim 1, wherein the apparatus exhibits at least about a 22% reduction in installation force in comparison to an apparatus not having an auxiliary gland over a range of percent compression of the O-ring from about 12% to about 22%.

9. The sealing apparatus of claim 1, wherein the base, the sealing surface, or both have a hardness of at least about 60 Durometer A.

10. The sealing apparatus of claim 1, wherein the O-ring has a hardness of at least about 30 Durometer A.

11. A replaceable filter cartridge comprising the sealing apparatus of claim 1, wherein the O-ring contacts the sealing surface of a housing for a filter system that compresses the O-ring into the sealing gland to create a seal when the cartridge is inserted in the housing.

12. The cartridge of claim 11, wherein the cartridge is an air filter cartridge, the filter system is an air filter system, and the sealing surface is a sealing ring.

13. A replaceable filter cartridge for a filter system, the cartridge comprising:
   (a) substantially cylindrical filter media; and (b) at least one sealing cap positioned at an end of the media, the sealing cap comprising a sealing apparatus, the apparatus comprising:
  (i) a substantially cylindrical base;
  (ii) an O-ring; and
  (iii) a sealing gland for the O-ring on a periphery of the base, the sealing gland comprising a primary gland and an auxiliary gland located below the primary gland;
wherein the O-ring sits in the sealing gland and the O-ring contacts a sealing surface of the filter system that compresses the O-ring into the sealing gland to create a seal when the cartridge is installed in the system; and
wherein the auxiliary gland has a width (w), the auxiliary gland has a depth (d), the O-ring has a cross-sectional diameter (O), $0.3<w/O<0.8$, and $0.2<d/O<0.4$.

14. The cartridge of claim 13, wherein the sealing surface of the filter system is provided by a sealing ring, and the sealing ring, the base, or both have a hardness of at least about 60 Durometer A.

15. The cartridge of claim 13, wherein the O-ring has a hardness of at least about 30 Durometer A.

16. An air filter cartridge for an air filter system, the cartridge comprising:
  (a) substantially cylindrical filter media; and
  (b) at least one sealing cap positioned at an end of the media and comprising a sealing apparatus, the apparatus comprising:
    (i) a substantially cylindrical base;
    (ii) an O-ring; and
    (iii) a sealing gland for the O-ring on a periphery of the base, the sealing gland comprising a primary gland and an auxiliary gland located below the primary gland;
  wherein the O-ring sits in the sealing gland and the O-ring contacts a sealing surface of the filter system that compresses the O-ring into the sealing gland to create a seal when the cartridge is installed in the system; and
  wherein the auxiliary gland has a width (w), the auxiliary gland has a depth (d), the O-ring has a cross-sectional diameter (O), $0.3<w/O<0.8$, and $0.2<d/O<0.4$.

17. The cartridge of claim 16, wherein the base has a hardness of at least about 60 Durometer D.

\* \* \* \* \*